United States Patent [19]

Grosseau

[11] 3,858,946
[45] Jan. 7, 1975

[54] MECHANISM FOR THE ANTI-LOCKING BRAKING OF A WHEEL OF A MOTOR VEHICLE

[75] Inventor: Albert Grosseau, Chaville, France

[73] Assignee: Societe Anonyme Automobiles Citroen, Paris, France

[22] Filed: Mar. 7, 1973

[21] Appl. No.: 339,010

[30] Foreign Application Priority Data
Mar. 9, 1972 France .................................. 72.8304

[52] U.S. Cl. ............... 303/21 F, 188/181 A, 303/68
[51] Int. Cl. ............................................ B60t 8/12
[58] Field of Search ................. 303/21 F, 61–63, 303/68–69, 10; 188/181

[56] References Cited
UNITED STATES PATENTS

| 3,549,212 | 12/1970 | Leiber .............................. 303/21 F |
| 3,550,966 | 12/1970 | Leiber .............................. 303/21 F |
| 3,695,734 | 10/1972 | Hennig et al. ..................... 303/21 F |
| 3,713,708 | 1/1973 | Michellone et al. ................ 303/21 F |
| 3,752,537 | 8/1973 | Ochiai .............................. 303/21 F |

Primary Examiner—George E. A. Halvosa
Assistant Examiner—D. C. Butler
Attorney, Agent, or Firm—Marn & Jangarathis

[57] ABSTRACT

An anti-locking braking system for a wheel of a motor vehicle in which a first valve is actuated by a sensing device when the wheel is tending to lock and blocks the supply of fluid under pressure to the brake cylinder and allows the pressure fluid from the cylinder to exhaust via a path including an accumulator whose volume can be increased by the pressure of the exhausting fluid overcoming spring pressure. Upon the volume of the accumulator exceeding a predetermined value a second valve operates to reduce the rate at which the pressure of the exhausting fluid falls. Thus the pressure drop in the cylinder is at first relatively large and subsequently more slow which reduces the chance of jerking of the vehicle.

9 Claims, 6 Drawing Figures

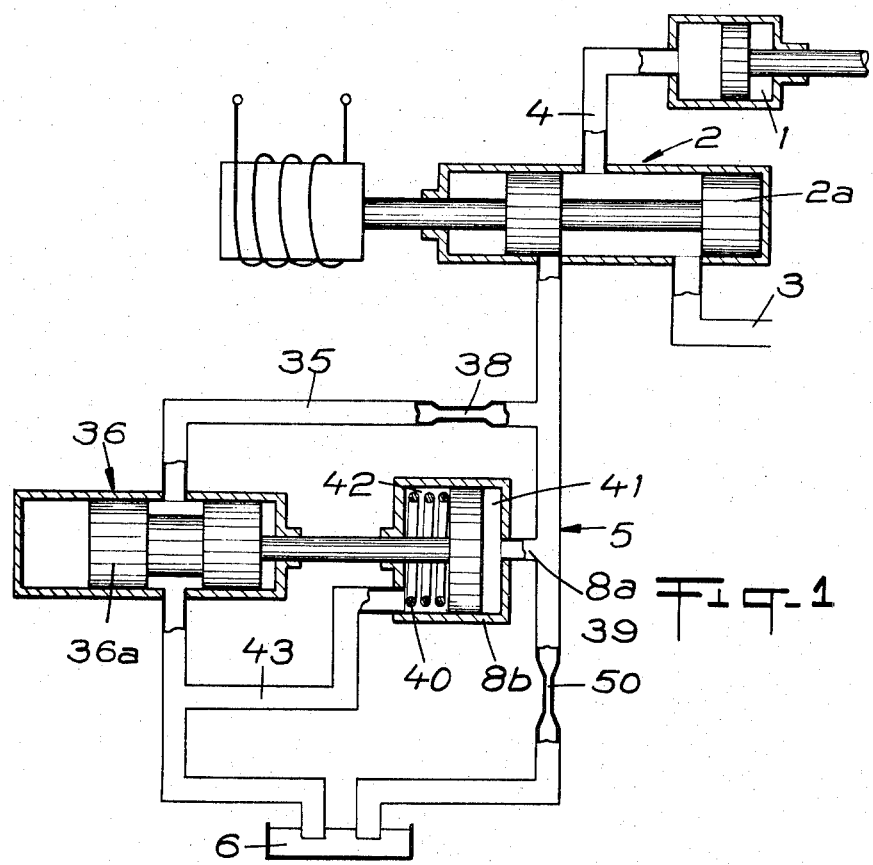
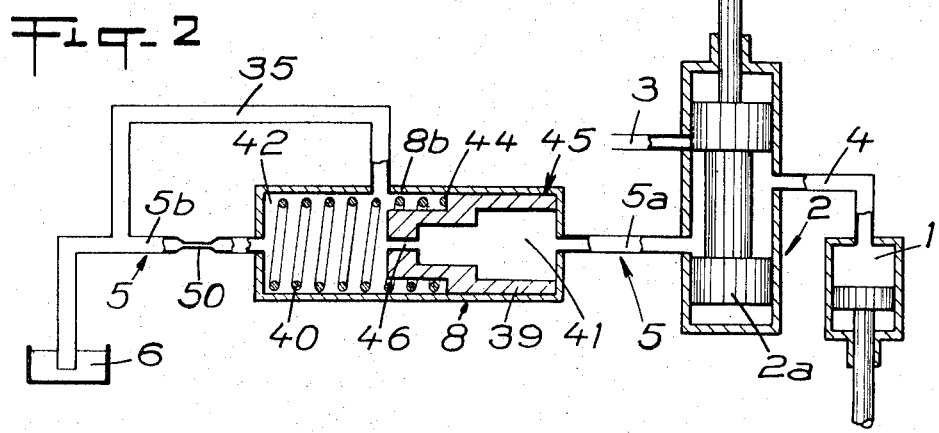

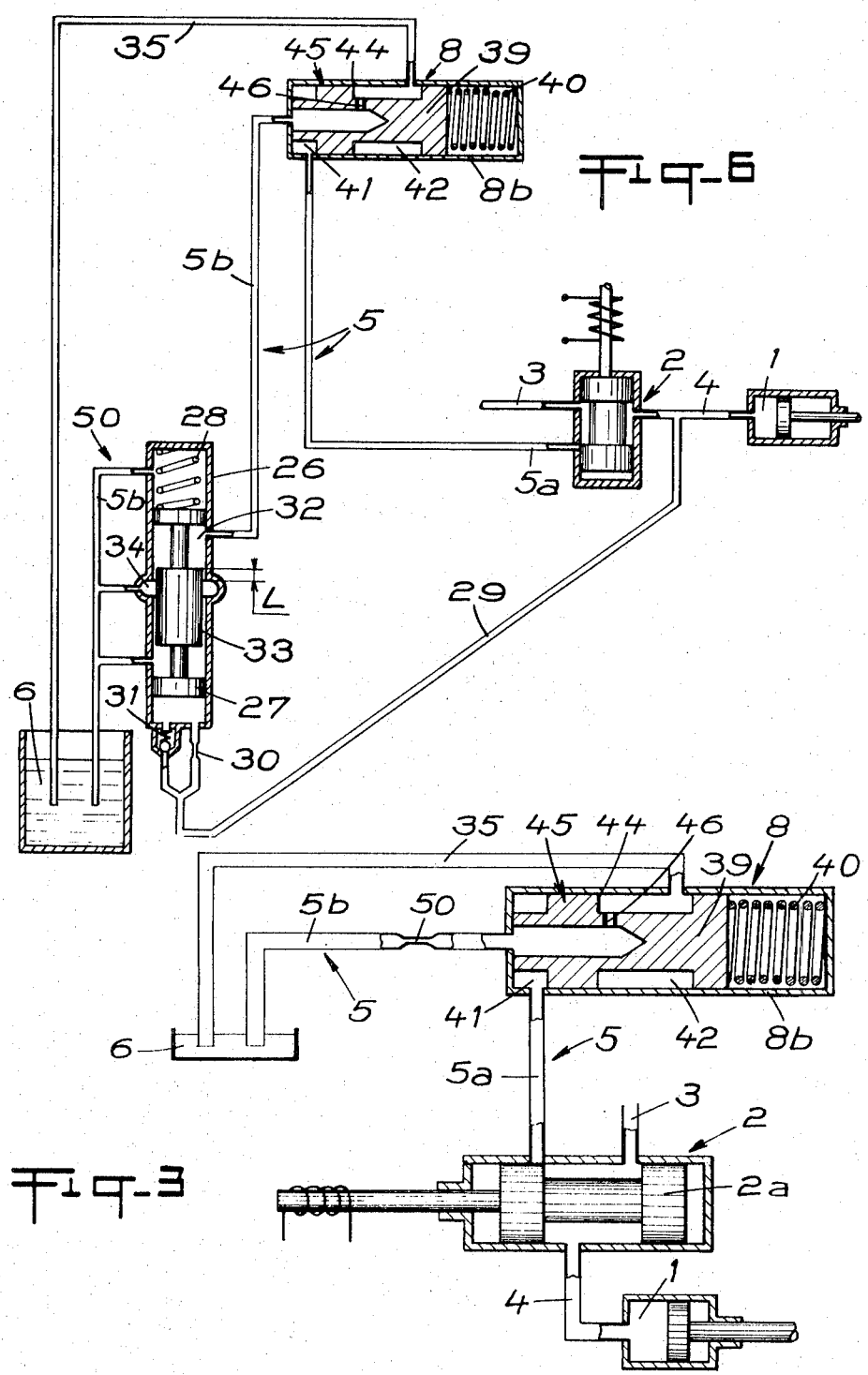

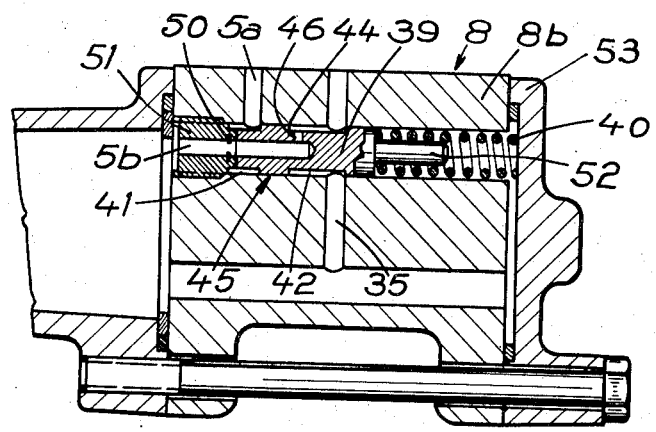
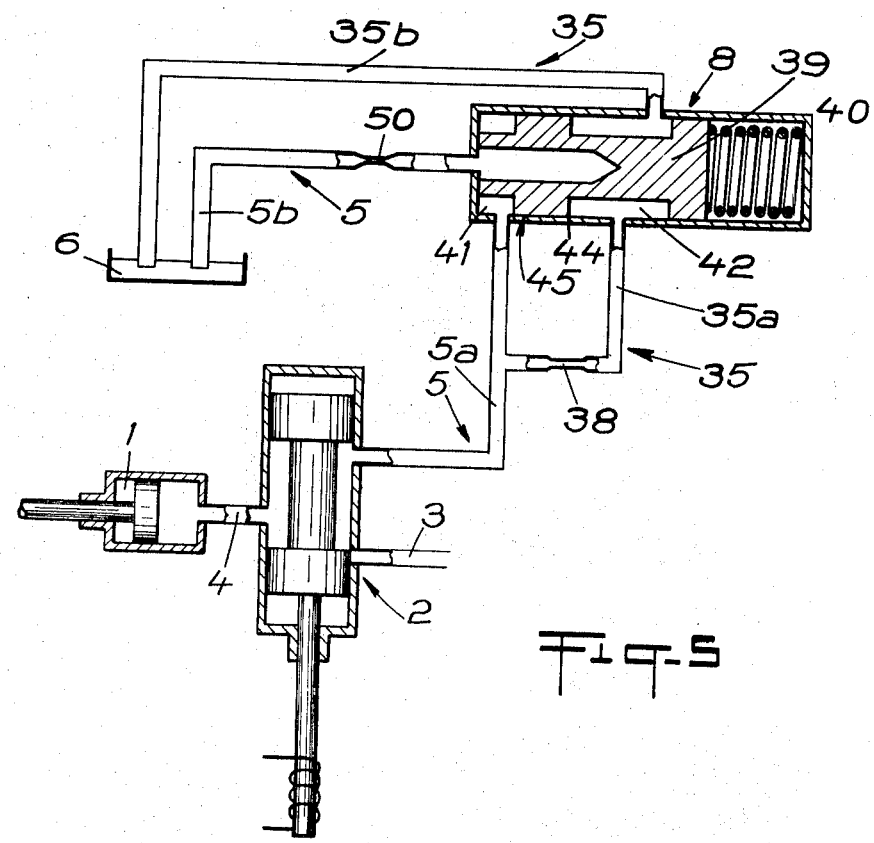

MECHANISM FOR THE ANTI-LOCKING BRAKING OF A WHEEL OF A MOTOR VEHICLE

French Patent No. 2,052,196 describes an anti-locking mechanism for braking a wheel of a vehicle comprising in particular a controlled valve connecting the braking members selectively and depending on the dynamic state of the wheel, to a source of fluid under pressure and to an exhaust pipe comprising a flow-limiter and an acuumulator interposed in the conduit between said valve and the flow-limiter.

This mechanism eliminates the jerks normally occurring at the time of the successive exhausting necessary for effective unlocking in devices of the type having a discharge valve which operates fully or not at all.

The invention, intending to retain the aforesaid advantages, proposed to add constructive arrangements to the same type of anti-locking mechanism with a view to simplifying the construction, reducing the bulk thereof and above all accelerating the emptying of the accumulator defined in the main Patent, in order that its volume is rapidly available for a new cycle of exhausting the braking members.

To this end, the invention relates to a device which is constituted by a source of fluid under pressure, by fluid pressure actuated brake operating means connected to the brake of said wheel, by a valve controlled by a control device detecting the dynamic state of the wheel and able to connect the brake operating means selectively to the source of fluid under pressure and to a first exhaust conduit. A first flow-limiter is arranged in said first conduit, and an accumulator is interposed in said first conduit, between the controlled valve and the first flow-limiter.

According to the invention, an auxilliary exhaust conduit is branched from the first conduit, between the controlled valve and the first flow-limiter. Moreover, an auxilliary flow-limiter, for example a restriction, is disposed between the controlled valve and the end of said auxilliary conduit. In addition, closing means are connected to the moving member of the accumulator and are constituted in order to close and auxiliary conduit when the volume of the accumulator is greater than a given value.

In a preferred embodiment of the invention, the accumulator is defined by a rigid cylindrical hollow body and by a piston slidably mounted in said cylindrical body, this piston defining a first and a second chamber in said boyd, whereas spring return means are connected between said piston and said cylindrical body and have an action tending to make the volume of the first chamber minimal. Advantageously, the value of the pressure drop of the second flow-limiter is appreciably less than that of the first said flow-limiter.

Moreover, in this embodiment, since the part of the first conduit comprised between the controlled valve and the connection of the auxilliary conduit, and said auxilliary conduit constitutes a said exhaust circuit, the first and second chambers are connected to this exhaust circuit respectively unstream and downstream of the auxilliary flow-limiter, the means for closing the auxilliary conduit being connected to said piston.

Advantageously, in another embodiment and its variations described hereafter, the first and second chambers are mounted respectively in series in the first conduit and the auxilliary conduit. The means for closing the auxilliary conduit are constituted advantageously by one edge and the adjacent bearing surface of the piston of the damper cooperating with the connecting aperture or apertures of said auxilliary conduit in the second chamber.

In the said embodiment, the junction between the first conduit and the auxilliary conduit is established through the second chamber.

In a first of said variations, the junction between the first conduit and the auxilliary conduit is established through the first chamber.

The second of these variations proposes the establishment of the junction between the first conduit and the auxilliary conduit upstream of the accumulator with respect to the controlled valve.

The auxilliary flow-limiter of the embodiment and its variations described hereafter is preferably constituted by an aperture provided in the piston and connecting the first and second chambers.

It is possible to envisage a third embodiment, whilst retaining the advantageous arrangements aforedescribed, in which the pressure drop of the first flow-limiter varies depending on the pressure reached in the receiving members at the time of exhausting the controlled valve.

The invention will be better understood and its secondary features and advantages will be apparent from the detailed description of an embodiment given hereafter as a non-limiting example.

Reference is made to the accompanying drawings in which:

FIG. 1 is a diagrammatic illustration of a device according to the invention,

FIG. 2 is a diagrammatic illustration of an embodiment according to the invention, FIG. 3 is a diagrammatic illustration of a variation of this embodiment according to the invention, FIG. 4 is another more detailed and preferred illustration of this variation, FIG. 5 is a diagrammatic illustration of another embodiment according to the invention, and, FIG. 6 is a diagrammatic illustration of another embodiment according to the invention.

Referring firstly to FIG. 1, there may be seen a valve 2 controlled by means detecting the dynamic state of the wheel connected to a source of fluid under pressure, not shown, by the conduit 3, the fluid pressure actuated brake operating means connected to the wheel represented by the brake cylinder 1, by the conduit 4 and to a fluid reservoir 6 by a first exhaust conduit 5.

According to the position of the slide 2a of the controlled valve, a connection is established either between the conduits 3 and 4 or between the conduits 4 and 5, in this case the conduit 3 preferably being closed.

It will also be noted from this same figure that a first flow-limiter 50 is arranged in the conduit 5 between the controlled valve 2 and the fluid reservoir 6. An accumulator 8 is connected to the conduit 5 by a conduit 8a between the controlled valve 2 and the limiter 50. An auxilliary exhaust conduit 35 is also connected to the conduit 5 between the controlled valve 2 and the flow-limiter 50 and is connected to the fluid reservoir 6 to which it returns. Means for closing the conduit 35 are represented by a valve 36, the slide 36a of which is connected to a moving member 37, for example a piston or elastic membrane, located in the accumulator 8, which slide 36a acts in the direction of closure of the conduit 35 when the volume of the accumulator 8 is greater than a given value.

An auxilliary flow-limiter 38, for example a restriction is located in the conduit 35. The accumulator 8 is constituted by a rigid hollow cylindrical body 8b and by a moving member, in this case a piston 39 slidably mounted in the body 8b subjected to the action of a spring 40, the action of which is to make the volume of the damper minimal. The slide 36a of the valve 36, connected to the piston 39, acts in the direction of opening the conduit 35 under the action of the spring 40. Thus the piston 39 defines two chambers, in the accumulator 8, a first chamber 41 connected by the conduit 8a either directly or by the intermediary of the conduit 5, to the conduit 35, upstream of the auxilliary flow-limiter 38 and a second chamber 42 connected to the auxilliary conduit 35 by a conduit 43, downstream of the auxilliary flow-limiter 38. Preferably, the auxilliary flow-limiter 38 has a pressure drop whose value is appreciably less than that of the pressure drop of the first flow-limiter 50. The flow-limiter 38 may also be located between the controlled valve 2 and the connection of the conduit 35 to the conduit 5; in this case, the conduit 8a is connected to the conduit 5 between the controlled valve 2 and the flow-limiter 38.

The exhausting of the brake operating means 1 connected to the wheel is effected by the controlled valve 2 During a first period of time, the fluid contained in the brake operating means 1 escapes through the conduit 5 and the conduit 35, through the auxilliary flow-limiter 38, these two conduits and the auxilliary flow-limiter forming a first exhaust path, to the fluid reservoir 6. This first exhaust path is preferably used by the fluid since on the one hand, the first flow-limiter 50 constitutes a fluid reserve having a pressure drop whose value is greater than that of the said first path and on the other hand, the slide 36a of the valve 36 is in its position opening the conduit 35, the moving member 37 of the accumulator 8 to which the slide 36 is connected being in the position of minimum volume of said accumulator.

During this first period of time, the accumulator 8 fills and its moving member 37 is pushed towards the left. It has the effect of imparting its movement to the slide 36a of the valve 36 which assumes the position closing the conduit 35. After this closure, a second period of time begins, during which the fluid may escape only through the conduit 5, by way of the first flow-limiter 50, to the fluid reservoir 6, the conduit 5 and the limiter 50 forming a second exhaust path for said fluid.

Due to the first path used by the fluid, the pressure drop in the brake operating means 1 is abrupt and facilitates rapid unlocking of the wheel. As long as the wheel is not rotating sufficiently in order that the receiving members are able to receive the braking pressure again, the fluid may escape to the reservoir 6, by the second path, the pressure drop thus being much slower.

Advantageously, a device of this type allows rapid emptying of the accumulator 8 and thus increased availability for a new cycle of exhausting the brake operating means 1, when the braking pressure is once more admitted to said brake operating means 1. In fact, the moving member 37 of the accumulator 8, returning to its position defining the minimum volume of the accumulator 8 when the pressure in said accumulator has reached a sufficiently low value, causes the opening of the auxilliary conduit 35 and allows the flow of the fluid contained in the accumulator 8 through the circuit 35 to return towards the fluid reservoir 6.

Advantageously, as will be apparent from the embodiments described hereinafter, it is possible to arrange the first chamber 41 in series with the conduit 5 and the second chamber 42 in series with the auxilliary conduit 35. Thus, the piston 39 may advantageously constitute the means for closing the auxilliary conduit 35.

In the embodiment illustrated in FIG. 2, the two chambers 41 and 42 of the accumulator 8 have a variable volume. The first chamber 41 is in series with the first conduit 5 and the second chamber 42 is connedted to the auxilliary conduit 35. Moreover, downstream of the flow-limiter 50 with respect to the valve 2, this conduit 35 is connected to the conduit 5 and by this conduit, to the reservoir 6.

Means for closing the auxilliary conduit 35 are constituted by an edge 44 and the adjacent bearing surface 45 of the piston 39, able to close the aperture connecting said auxilliary conduit 35 to the body 8b of the accumulator 8 after a given filling of the volume of the first chamber 41. An aperture 46, provided in the piston, connects the two said chambers 41 and 42. The aperture 46 is calibrated and consequently constitutes the flow-limiter 38 in FIG. 1.

The previously defined first path is in this case constituted by the part 5a of the first conduit 5, the first chamber 41, the aperture 46, the second chamber 42 and the auxilliary conduit 35 returning to the reservoir 6. The second path, solely existing after closure of the auxilliary conduit 35, is constituted by the part 5a of the first conduit, first chamber 41, the aperture 46, the second chamber 42 and the portion 5b of the conduit 5 returning to the fluid reservoir 6 from the accumulator 8 and comprising the flow-limiter 50.

It will be noted that the aperture 46, which fulfils the function of auxilliary flow-limiter, due to the creation of a differential pressure in the two chambers 41 and 42 facilitates the displacement of the piston 39 towards the left when the fluid contained in the brake operating means is exhausted.

The emptying takes place in the same manner as with regards to FIG. 1, namely, when the pressure in the accumulator 8 has reached a sufficiently slight value, the spring 40 pushes the piston 39 which opens the aperture connecting the auxilliary conduit 35 to the second chamber 42 and the accumulator empties rapidly through the aperture 46 and conduit 35. The volume of the accumulator is thus completely available for a new cycle of exhausting the receiving members 1.

The variation, illustrated in FIG. 3, has a second chamber 42 having a constant volume. The connection of the auxilliary conduit 35 to the body 8b of the accumulator 8 opens into the second chamber 42 whereas the conduit 35 is connected to the first conduit 5 through the first chamber 41.

Thus the afore-defined first path for the fluid is composed of the part 5a of the conduit 5, of the chamber 41, of the aperture 46, of the chamber 42 and of the auxilliary conduit 35 returning to the fluid reservoir 6. The second path is thus composed of the part 5a of the conduit 5, of the chamber 41 and of the part 5b of the conduit 5 returning to the reservoir 6 and comprising the flow-limiter 50.

Advantageously, this variation places the auxilliary flow-limiter 46 in parallel with the first flow-limiter 50, which is particularly advantageous when emptying the accumulator 8.

FIG. 4 adopts the arrangements of FIG. 3 in the form of a preferred industrial construction of the accumulator 8.

The flow-limiter 50 is preferably a calibrated aperture of a threaded plug 51 which closes the chamber 41. When this chamber is at its minimum volume, the piston 39 abuts against the plug 51, when it is at its maximum volume the piston 39 abuts against the cover 53 by its end 52 concentric with return spring 40. It will be noted that the opening of the auxilliary conduit 35 by the edge 44 of the piston 39 takes place from the first part of the return stroke of the piston 39 to the stationary position illustrated in FIG. 4.

Moreover, with regard to FIG. 5, another variation of the device according to the invention is shown, in which the junction of the auxillary conduit 35 to the first conduit 5 is established upstream of the first chamber 41 of the accumulator 8. As in the preceding variation, the chamber 42 has a constant volume.

On the other hand, the auxilliary flow-limiter 38 is supported by the first portion 35a of the conduit 35 connecting the conduit 5 to the second chamber 42 of the accumulator 8.

The closure of the conduit 35 is now effected by the edge having the reference numeral 44 in FIG. 5 and the bearing surface 45 of the piston 39, able to close the aperture connecting the portion 35a to the chamber 42.

It may thus be said that the first fluid path is defined by the first portion 5a of the conduit 5, the portion 35a of the auxilliary conduit 35 supporting the auxilliary flow-limiter 38, the second chamber 42 of the accumulator 8, the second portion 35b of the conduit 35 returning to the reservoir 6. The second path is defined as in the previous variation, namely by the portion 5b of the conduit 5, the first chamber 41 of the accumulator 8, the portion 5b of the conduit 5 also returning to the fluid reservoir 6 and comprising the first flow-limiter 50.

FIG. 6 shows another embodiment in which the firsr flow-limiter 50 has a variable pressure drop. This figure again shows certain of the parts already mentioned with regard to FIG. 3. In addition, on examining the conduit 5b at the part of the variable accumulator 8, there can be seen the body 26 of a control valve which is connected to the conduit 5b. Inside the body 26, a slide 27 is slidably mounted and is in equilibrium under the opposing action of a spring 28 and of the pressure of the fluid conveyed by a conduit 29 connected to the conduit 4. It will also be noted that a restriction 30 may be arranged in the conduit 29 and that in parallel to this restriction 30 a non-return valve 31 may also be located and may ensure the passage of the fluid from the conduit 4 to the body 26 of the control valve. The conduit 5 coming from the accumulator 8 opens into a chamber 32 provided between the slide 27 and the body 26. A channel 33 is also provided between the slide 27 and the body 26 and constitutes the flow-limiter proper. This channel 33 is connected to the latter part of the conduit 5b which returns to the reservoir 6. In the example illustrated, the channel 33 is constituted by an annular cylinder of length L which connects the chamber 32 to a groove 34 connected by the conduit 5b to the reservoir 6. This annular cylinder is constituted in the example shown by the play provided between the body 26 and the corresponding part opposite the slide 27 which, at this point has a section less than that of the body 26.

The emptying of the accumulator 8 is advantageously accelerated in all the embodiments above-described. In fact, the fluid contained in said accumulator is able to return to the fluid reservoir by a path having a pressure drop appreciably less than that of the first flow-limiter 50. As has been aforesaid, the availability of said accumulator 8 is thus increased due to this rapid emptying.

The afore-described device, as well as its variations, make it possible, for a given bulk, to incrase if necessary the maximum volume of the accumulator 8, thus to create a greater abrupt pressure drop at the beninning of unlocking of the wheel.

A device of this type may have an advantageous application in being integrated in the braking system of a motor vehicle.

The invention is not limited to the embodiment which has been described but, on the contrary, includes all variations which could be applied thereto without diverging from its framework or spirit.

What is claimed is:

1. Mechanism for the anti-locking braking of a wheel of a motor vehicle, comprising a source of fluid under pressure controlled by the driver, fluid pressure brake operating means connected to the brake of said wheel, a valve controlled by a control device detecting the dynamic state of the wheel and able to connect the brake operating means selectively to the source of fluid under pressure and to a first exhaust conduit, a first flow-limiter being arranged in said first exhaust conduit and an accumulator whose variable internal volume is determined by the position of an element movable therein under the effect of fluid pressure against an elastic member tending to render said internal volume minimal, said accumulator being interposed in said first exhaust conduit between the controlled valve and said first flow-limiter, characterized in that an auxilliary exhaust conduit is branched from said frist exhaust conduit between the controlled valve and the first flow-limiter and wherein an auxilliary flow-limiter is located between the controlled valve and the end of the auxilliary conduit and wherein closing means is connected to the moving element of the said accumulator to close said auxilliary exhaust conduit when said internal volume is greater than a given value.

2. The device according to claim 1 wherein said accumulator is comprised of a hollow rigid cylindrical body and a piston slidably mounted in said cylindrical body defining a first and a second chamber in said body, and wherein an elastic return means is connected between said piston and said cylindrical body and has an effect tending to make the volume of said first chamber minimal and wherein the value of the pressure drop of said auxilliary flow-limiter is appreciably less than that of said first flow-limiter and wherein a part of said first exhaust conduit between said control valve and connection of said auxilliary conduit and the auxilliary conduit constitutes an exhaust circuit, said first and second chamber being connected to said exhaust circuit upstream and downstream, respectively, of said auxilliary flow-limiter, said closing means being connected to said piston.

3. The device according to claim 2, characterized in that the pressure drop of the first flow-limiter is variable depending on the pressure reached in the receiving members at the time when the controlled valve is exhausted.

4. The device according to claim 2 wherein said second chamber is mounted in series with said auxilliary conduit opening in said chamber through at least one aperture made in the body of the accumulator, and in that the first chamber is mounted in series with the first conduit.

5. The device according to claim 4 characterized in that the junction between the first conduit and the auxilliary conduit is established upstream of the accumulator, with respect to the control valve.

6. The device according to claim 4 characterized in that the closing means are constituted by one edge and the adjacent bearing surface of the piston co-operate with said aperture through which the auxilliary conduit opens to said second chamber.

7. The device according to claim 2 characterized in that the auxilliary flow-limiter is constituted by a hole provided in the piston and connecting the first and second chambers.

8. The device according to claim 7 characterized in that the junction between the first conduit and the auxilliary conduit is established through the second chamber.

9. The device according to claim 7 characterized in that the junction between the first conduit and the auxilliary conduit is established through the first chamber.

* * * * *